(12) United States Patent
Lin

(10) Patent No.: US 8,482,203 B2
(45) Date of Patent: Jul. 9, 2013

(54) STARTER FOR ELECTRODELESS DISCHARGE LAMP

(76) Inventor: Chang-Shien Lin, Changhua County (TW)

( * ) Notice: Subject to any disclaimer, the term of this patent is extended or adjusted under 35 U.S.C. 154(b) by 561 days.

(21) Appl. No.: 12/639,755

(22) Filed: Dec. 16, 2009

(65) Prior Publication Data

US 2011/0140603 A1 Jun. 16, 2011

(51) Int. Cl.
*H01J 7/44* (2006.01)
*H01J 17/16* (2012.01)

(52) U.S. Cl.
USPC ............... 315/56; 315/59; 315/248; 313/634

(58) Field of Classification Search
USPC .............. 315/56–63, 70, 248, 344; 313/567, 313/634, 637
See application file for complete search history.

(56) References Cited

U.S. PATENT DOCUMENTS

| 5,113,121 | A  | * | 5/1992  | Lapatovich et al. | ........ 315/248 |
| 6,404,141 | B1 | * | 6/2002  | Miyazaki et al.   | ........ 315/248 |
| 6,642,671 | B2 | * | 11/2003 | Kurachi et al.    | ........ 315/248 |
| 7,064,490 | B2 | * | 6/2006  | Hashimotodani et al. | ..... 315/56 |

* cited by examiner

*Primary Examiner* — Jimmy Vu
(74) *Attorney, Agent, or Firm* — Raymond Y. Chan; David and Raymond Patent Firm

(57) ABSTRACT

A starter for electrodeless discharge lamp comprises a printed circuit sheet, at least one printed circuit trace, and at least one electrode. The printed circuit trace and the electrode are provided on the printed circuit sheet and are electrically connected to each other. The printed circuit sheet is arranged on a magnetic core of an electrodeless discharge lamp, such that the printed circuit trace surrounds the magnetic core and the electrode is located close to a discharge gas inside the electrodeless discharge lamp. The starter has simple structure and is easy to mount, and allows a ballast to start the electrodeless discharge lamp at a low voltage.

10 Claims, 21 Drawing Sheets

A-A'

B-B'

STARTER FOR ELECTRODELESS DISCHARGE LAMP

FIELD OF THE INVENTION

The present invention relates to a starter for electrodeless discharge lamp, and more particularly to a starter for electrodeless discharge lamp that has simple structure and is easy to mount, and allows a ballast to start the electrodeless discharge lamp at a low voltage.

BACKGROUND OF THE INVENTION

An electrodeless discharge lamp does not have any electrode, and employs the principles of electromagnetic induction and gas discharge to emit light. The electrodeless discharge lamp mainly includes a ballast, at least one magnetic toroid core, and a lamp tube. The high-frequency ballast delivers energy, which passes through a main winding on the magnetic toroid core to generate high-frequency waves, which strike phosphor provided on an inner wall surface of the lamp tube, so that light is produced. Since the electrodeless discharge lamp does not have the problem of burned-out filament, it has prolonged service life. Further, the electrodeless discharge lamp produces less heat radiation during the operation thereof, has high working efficiency and does not flash. Therefore, the electrodeless discharge lamp has been widely developed. To further increase the starting efficiency and the working efficiency of the electrodeless discharge lamp, it has been tried to wind another set of auxiliary winding around the magnetic toroid core of the electrodeless discharge lamp, so that the electrodeless discharge lamp can be started at a further reduced input voltage. However, the provision of another set of auxiliary winding around the magnetic toroid core would often result in complicated and confused overall structure of the lamp to cause difficulty in installation thereof.

It is therefore desirable to develop a starter for electrodeless discharge lamp, so that the starter has simple structure and is easy to mount, and allows the ballast to start the electrodeless discharge lamp at a low voltage.

SUMMARY OF THE INVENTION

A primary object of the present invention is to provide a starter for electrodeless discharge lamp, which provides a printed circuit trace and an electrode on a printed circuit sheet. When electrodeless discharge lamp is provided with the printed circuit sheet, the printed circuit trace surrounds magnetic core and the electrode is located close to a discharge gas inside the electrodeless discharge lamp. The present invention has simple structure and is easy to mount, and allows the ballast to start the electrodeless discharge lamp at a low voltage.

To achieve the above and other objects, the starter for electrodeless discharge lamp according to an embodiment of a first type of the present invention comprises a printed circuit sheet; at least one printed circuit trace being provided on a surface of the printed circuit sheet; and at least one electrode being provided on the surface of the printed circuit sheet to electrically connected to the printed circuit trace; wherein the printed circuit sheet is arranged on a magnetic core of an electrodeless discharge lamp, such that the printed circuit trace is located around the magnetic core and the electrode is located close to a discharge gas inside the electrodeless discharge lamp.

The printed circuit sheet is also provided on an opposing surface with at least one printed circuit trace and at least one electrode electrically connected to the printed circuit trace.

The printed circuit traces are provided on the printed circuit sheet to parallel space from one another and obliquely extend across and between two opposite lateral edges of the printed circuit sheet, such that two ends of each of the printed circuit traces are separately located at the two opposite lateral edges of the printed circuit sheet.

The printed circuit sheet is provided with a fitting hole for fitting around a position on the magnetic core of the electrodeless discharge lamp, and the printed circuit trace surrounds the first fitting hole.

The printed circuit sheet is provided with an engaging section for engaging the magnetic core of the electrodeless discharge lamp.

The printed circuit sheet is provided on an opposing end portion with an opposing fitting hole for fitting around an opposing position on the magnetic core of the electrodeless discharge lamp, and the printed circuit trace surrounds the opposing fitting hole.

The electrode is an arcuate cross-sectioned conducting sheet.

The starter for electrodeless discharge lamp according to an embodiment of a second type of the present invention comprises a first printed circuit sheet being provided with a first fitting hole and a first electrode; a second printed circuit sheet being provided with a second fitting hole; and at least one third printed circuit sheet being located between the first and the second printed circuit sheet and provided with a third fitting hole and a printed circuit trace surrounds the third fitting hole; and the printed circuit trace being electrically connected to the first electrode; and the first, the second, and the third fitting hole being stacked for fitting around a position on a magnetic core of an electrodeless discharge lamp, and the first electrode is located close to a discharge gas inside the electrodeless discharge lamp.

The second printed circuit sheet is provided with a second electrode, the printed circuit trace being further electrically connected to the second electrode.

The first printed circuit sheet is provided with a first engaging section, the second printed circuit sheet is provided with a second engaging section, and the third printed circuit sheet is provided with a third engaging section; and the first, the second, and the third engaging section being stacked for engaging with an position on the magnetic core of the electrodeless discharge lamp.

The first printed circuit sheet is provided with a first opposing fitting hole, the second printed circuit sheet is provided with a second opposing fitting hole, and the third printed circuit sheet is provided with a third opposing fitting hole; the third printed circuit sheet being provided with another printed circuit trace surrounds the third opposing fitting hole and electrically connected to the printed circuit trace, the first, the second, and the third opposing fitting hole being stacked for fitting around an position on the magnetic core of the electrodeless discharge lamp.

The first printed circuit sheet is provided with a first opposing fitting hole, the second printed circuit sheet is provided with a second opposing fitting hole, and the third printed circuit sheet is provided with a third opposing fitting hole; the third printed circuit sheet being provided with another printed circuit trace surrounds the third opposing fitting hole and electrically connected between the printed circuit trace and the second electrode; and the first, the second, and the third opposing fitting hole being stacked for fitting around an position of the magnetic core of the electrodeless discharge lamp.

The first electrode is an arcuate cross-sectioned conducting sheet.

The second electrode is an arcuate cross-sectioned conducting sheet.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
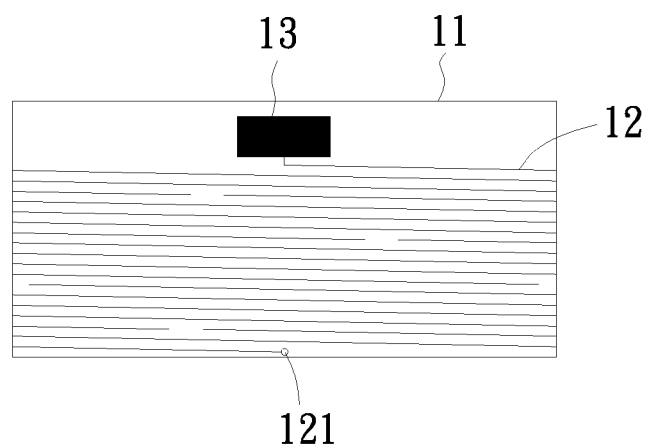
FIG. 1 is a schematic view of a starter for electrodeless discharge lamp according to a first embodiment of a first type of the present invention.
Figure 2:
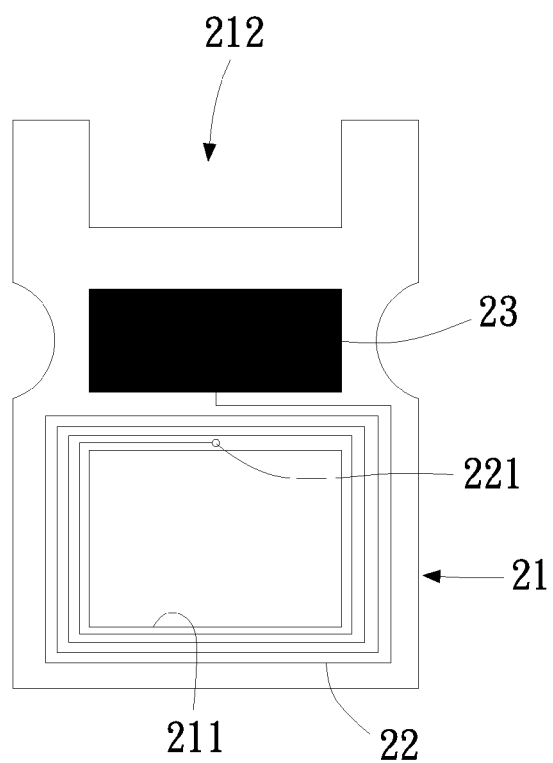
FIG. 2 is a schematic view of a starter for electrodeless discharge lamp according to a second embodiment of the first type of the present invention.
Figure 3:
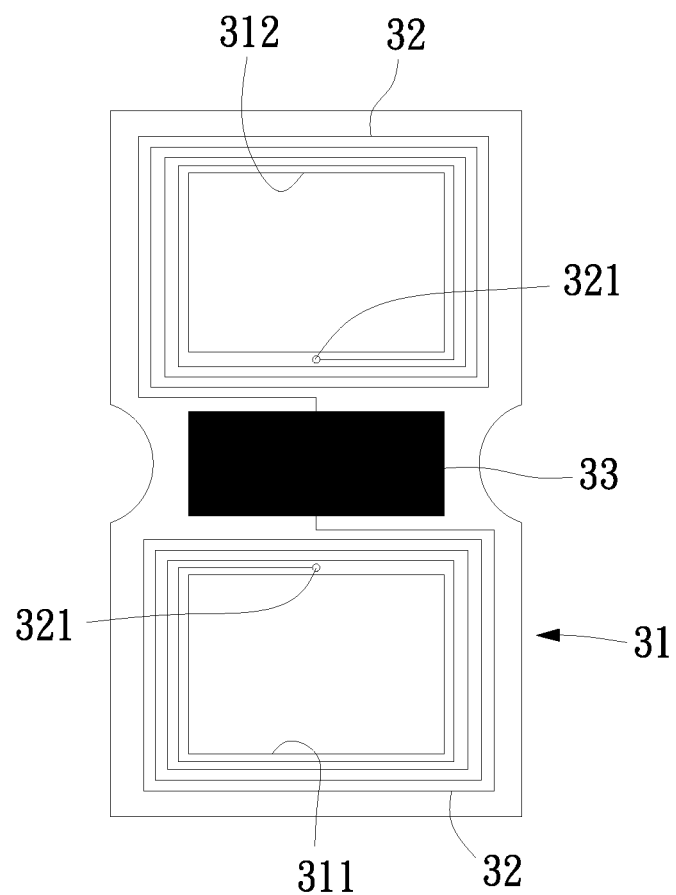
FIG. 3 is a schematic view of a starter for electrodeless discharge lamp according to a third embodiment of the first type of the present invention.

Please refer to FIGS. 1 to 3 that are schematic views of starters for electrodeless discharge lamp according to first, second and third embodiments, respectively, of a first type of the present invention. As shown, the starter for electrodeless discharge lamp in the first type of the present invention include a printed circuit sheet 11, at least one printed circuit trace 12, and at least one electrode 13. The printed circuit sheet 11 can be made of a rigid or a flexible material. The printed circuit trace 12 and the electrode 13 are provided on one surface of the printed circuit sheet 11. The number of the printed circuit trace 12 can be determined according to actual need. The larger the number of the printed circuit traces 12 is, the higher the obtained striking voltage is, and the easier the electrodeless discharge lamp can be started. The electrode 13 is electrically connected to the printed circuit trace 12. The printed circuit sheet 11 is mounted to a magnetic (toroid) core of the electrodeless discharge lamp, such that the printed circuit trace 12 surrounds the magnetic (toroid) core with the electrode 13 located closer to a discharge gas inside the electrodeless discharge lamp. In another embodiment of the present invention, additional printed circuit trace 12 and electrode 13 can be provided on opposing surface of the electric circuit sheet 11 to electrically connect to each other. That is, the printed circuit sheet 11 can be correspondingly provided on two opposite surfaces with the printed circuit trace 12 and the electrode 13.

As can be seen from FIG. 1, the printed circuit sheet 11 in the first embodiment of the first type of the present invention is in a rectangular shape with a plurality of parallelly spaced printed circuit traces 12 obliquely extending across and between two opposite lateral edges of the printed circuit sheet 11. That is, two ends of each of the printed circuit traces 12 are separately located at the two opposite lateral edges of the printed circuit sheet 11. The electrode 13 is located near an upper edge of the printed circuit sheet 11 to locate above the printed circuit traces 12, when viewing in front of FIG. 1, and is electrically connected to a left end of a first one of the printed circuit traces 12. A left end of a second one of the printed circuit traces 12 and a right end of the first printed circuit traces 12 are located on the same horizontal line; a left end of a third one of the printed circuit traces 12 and a right end of the second printed circuit trace 12 are located on the same horizontal line; and the same arrangement as described above is applied to all other subsequent printed circuit traces 12. The last one of the printed circuit traces 12 has a right end formed into an electrode point 121, which is referred to as a "via" in the printed circuit industry. The pattern of the printed circuit traces 12, the electrode point 121 and the electrode 13 can also be applied on the opposite surface of the printed circuit sheet 11.

As can be seen from FIG. 2, the printed circuit sheet 21 in the second embodiment of the first type of the present invention is provided with a fitting hole 211 and an engaging section 212. The printed circuit sheet 21 is mounted to the magnetic (toroid) core of the electrodeless discharge lamp with the fitting hole 211 fitted around a position on the magnetic (toroid) core. The printed circuit trace 22 surrounds the fitting hole 211 with a tail end of the printed circuit trace 22 formed into an electrode point 221. The electrode 23 is electrically connected to a front end of the printed circuit trace 22. The engaging section 212 can be substantially C-shaped for engaging the magnetic (toroid) core of the electrodeless discharge lamp. The pattern of the printed circuit trace 22, the electrode point 221 and the electrode 23 can also be applied on the opposite surface of the printed circuit sheet 21.

As can be seen from FIG. 3, the printed circuit sheet 31 in the third embodiment of the first type of the present invention is provided at two opposite end portions with two fitting holes 311, 312. The printed circuit sheet 31 is mounted to the magnetic (toroid) core of the electrodeless discharge lamp with the two fitting holes 311, 312 separately fitted around two opposing positions on the magnetic (toroid) core. Two printed circuit traces 32 separately surround the two fitting holes 311, 312 with tail ends of the printed circuit traces 32 formed into two electrode points 321. The electrode 33 is electrically connected to front ends of the two printed circuit traces 32. By providing two fitting holes 311, 312 on the printed circuit sheet 31, the number of turns of the printed circuit traces 32 around the magnetic (toroid) core of the electrodeless discharge lamp can be increased to thereby obtain increased striking voltage, enabling the electrodeless discharge lamp to be more easily started. The pattern of the printed circuit trace 32, the electrode point 321 and the electrode 33 can also be applied on the opposite surface of the printed circuit sheet 31.

Figure 4:
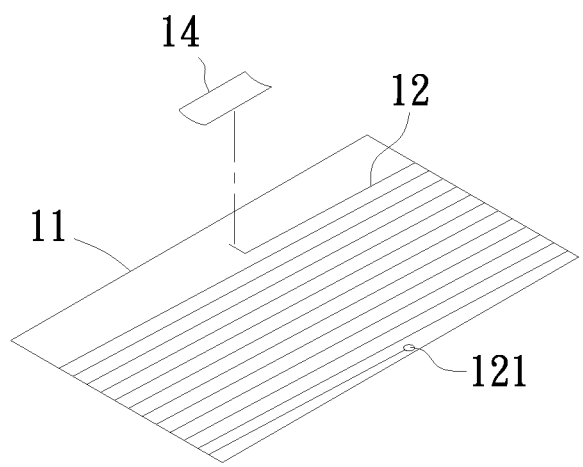
FIG. 4 is a schematic view of a starter for electrodeless discharge lamp according to a fourth embodiment of the first type of the present invention.

Please refer to FIG. 4 that shows a starter for electrodeless discharge lamp according to a fourth embodiment of the first type of the present invention. The starter in the fourth embodiment of the first type is generally structurally similar to the first embodiment of the first type, except for an arcuate cross-sectioned conducting sheet 14 that forms an electrode on the printed circuit sheet 11. The arcuate cross-sectioned conducting sheet 14 can be fitly attached to a curved lamp tube of the electrodeless gas-discharged lamp to provide an increased contact area between them and accordingly, an enhanced starting efficiency of the lamp. The starters according to the second and third embodiments of the first type of the present invention can also be provided on respective printed circuit sheets with an arcuate cross-sectioned conducting sheet each to serve as an electrode.

In each of the embodiments of the first type of the present invention, it is also possible to stack a plurality of the starters to provide a multi-layer structure.

Figure 5:
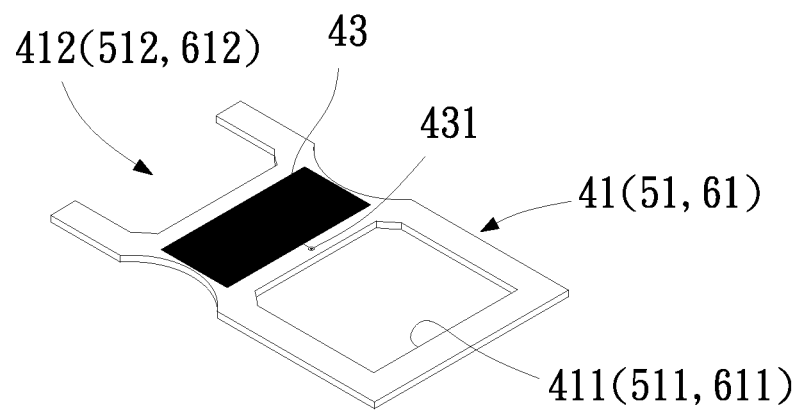
FIG. 5 is an assembled perspective view of a starter for electrodeless discharge lamp according to a first embodiment of a second type of the present invention.
Figure 6:
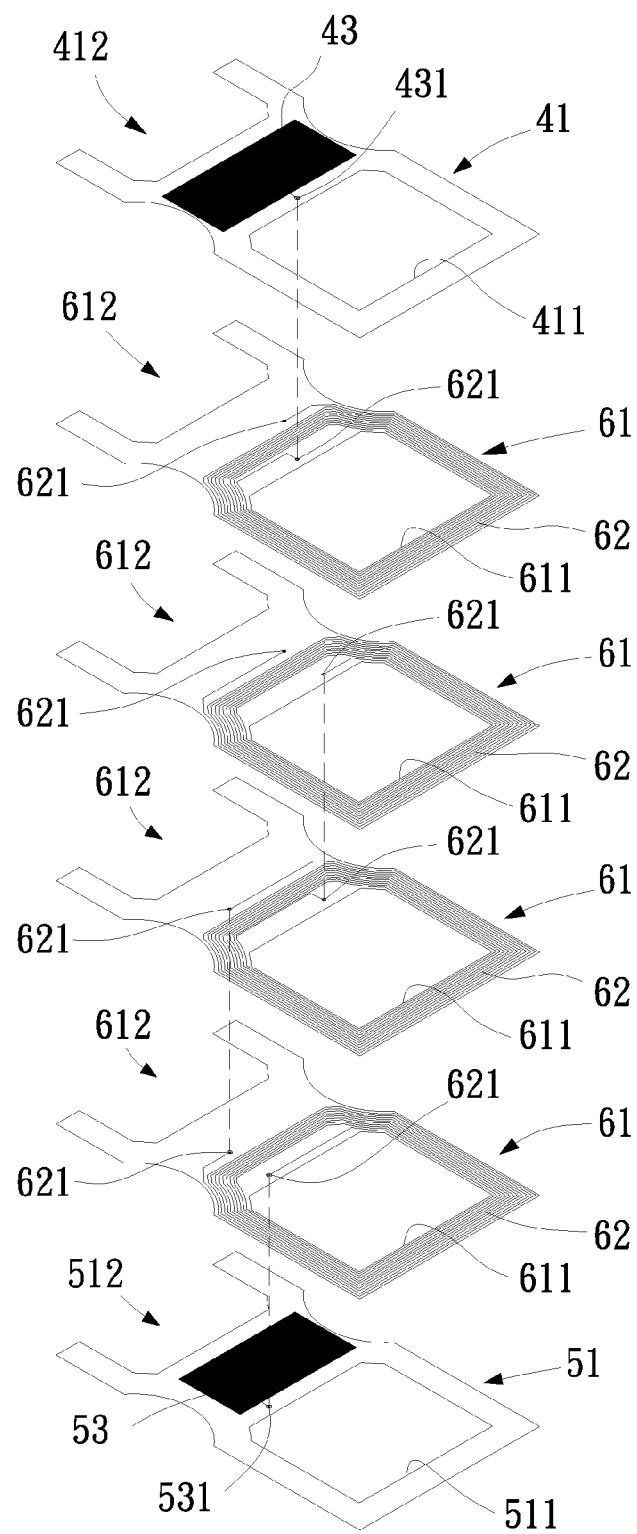
FIG. 6 is an exploded view of FIG. 5.

FIGS. 5 and 6 are assembled and exploded perspective views, respectively, of a starter for electrodeless discharge lamp according to a first embodiment of a second type of the present invention. As shown, the starter in the first embodiment of the second type of the present invention includes a first printed circuit sheet 41, a second printed circuit sheet 51, and at least one third printed circuit sheet 61. The first printed circuit sheet 41 is provided with a first fitting hole 411, and has a first electrode 43 arranged thereon. The second printed circuit sheet 51 is provided with a second fitting hole 511. The third printed circuit sheet 61 is provided with a third fitting hole 611, and has a printed circuit trace 62 surrounding the third fitting hole 611. The number of turns of the printed circuit trace 62 around the third fitting hole 611 can be determined according to actual need. The larger the number of turns of the printed circuit trace 62 is, the higher the obtained striking voltage is, and the easier the electrodeless discharge lamp can be started. The third printed circuit sheet 61 is located between the first and the second printed circuit sheet 41, 51, and the printed circuit trace 62 is electrically connected to the first electrode 42. The first, second and third fitting holes 411, 511, 611 are stacked for fitting around a position on the magnetic (toroid) core of the electrodeless discharge lamp with the first electrode 43 located close to the discharge gas inside the electrodeless discharge lamp. An additional second electrode 53 can be provided on the second printed circuit sheet 51, and, in this case, the printed circuit trace 62 is also electrically connected to the second electrode 53.

In the first embodiment of the second type of the present invention as illustrated in FIGS. 5 and 6, four pieces of the third printed circuit sheets 61 are provided. The number of the third printed circuit sheets 61 can be determined according to actual need. The larger the number of the third printed circuit sheets 61 is, the higher the obtained striking voltage is, and the easier the electrodeless discharge lamp can be started. Tail ends of the printed circuit traces 62 are formed into two electrode points 621. The first electrode 43 and the second electrode 53 each also have an electrode point 431, 531 extended therefrom. The first electrode 43, the second electrode 53, and the printed circuit traces 62 are electrically connected to one another via the electrode points 431, 531 and 621. The first printed circuit sheet 41 is further provided with a first engaging section 412, the second printed circuit sheet 51 is further provided with a second engaging section 512, and each of the third printed circuit sheets 61 is further provided with a third engaging section 612. The first, second and third engaging sections 412, 512, 612 can be substantially C-shaped for engaging with the magnetic (toroid) core of the electrodeless discharge lamp.

Figure 7:
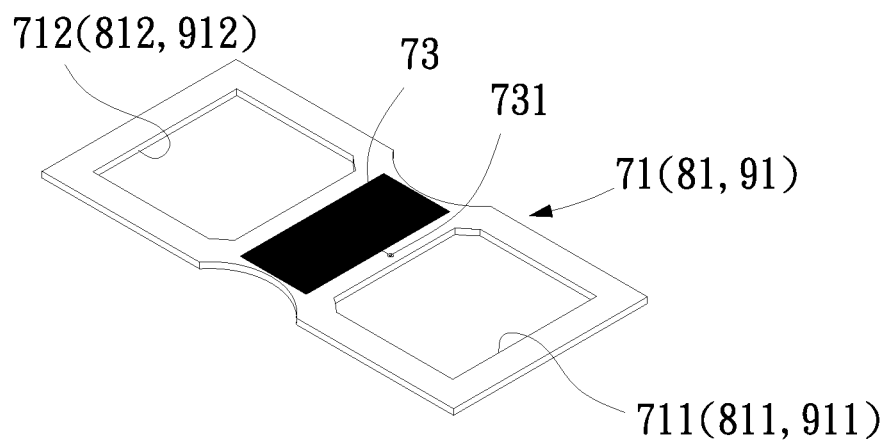
FIG. 7 is an assembled perspective view of a starter for electrodeless discharge lamp according to a second embodiment of the second type of the present invention.
Figure 8:
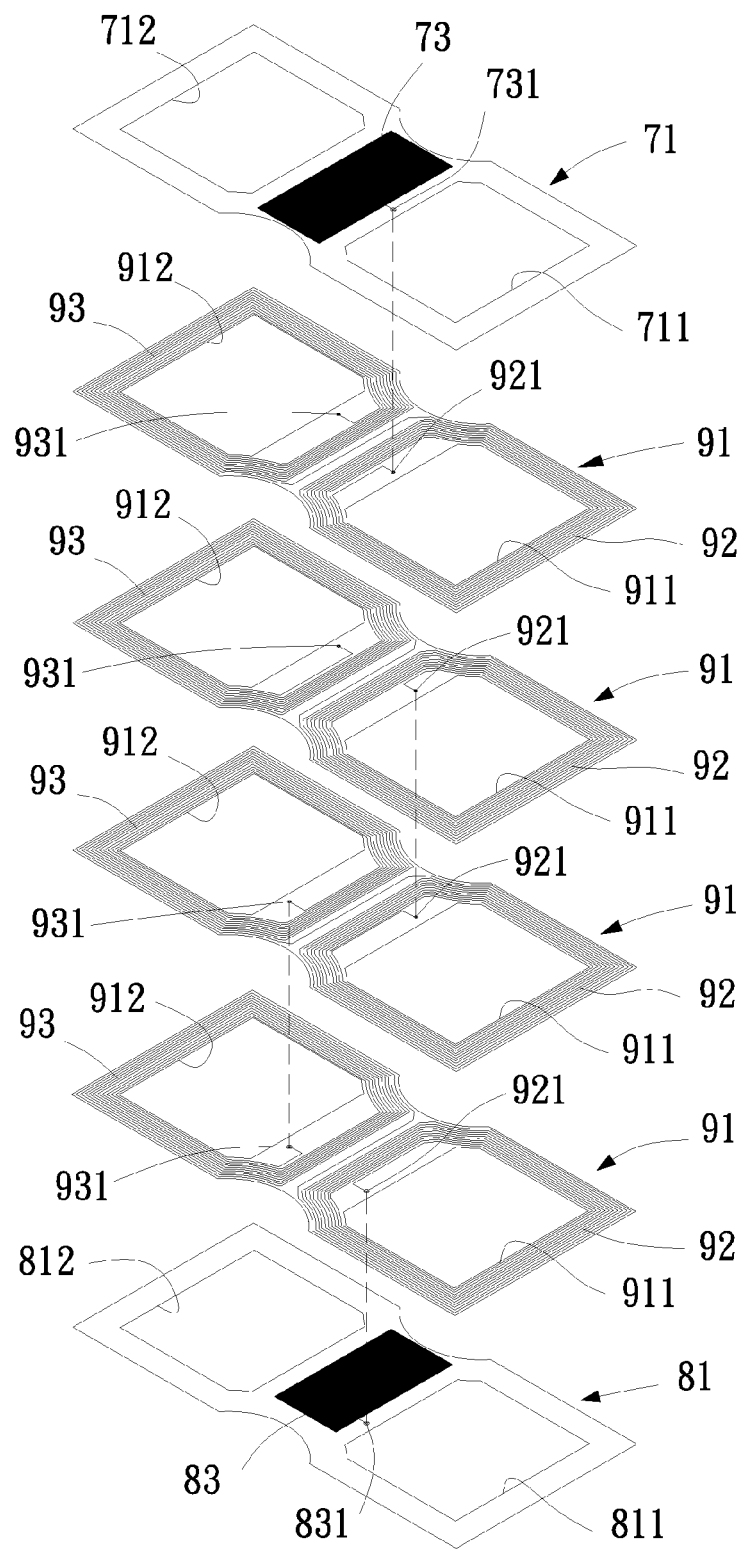
FIG. 8 is an exploded view of FIG. 7.

FIGS. 7 and 8 are assembled and exploded perspective views, respectively, of a starter for electrodeless discharge lamp according to a second embodiment of the second type of the present invention. As shown, the starter in the second embodiment of the second type of the present invention includes a first printed circuit sheet 71, a second printed circuit sheet 81, and at least one third printed circuit sheet 91, which are generally structurally similar to the first, second and third printed circuit sheets 41, 51, 61 in the first embodiment of the second type, except that a first fitting hole 711 and a first opposing fitting hole 712, a second fitting hole 811 and a second opposing fitting hole 812, and a third fitting hole 911 and a third opposing fitting hole 912 are respectively provided on the first, second and third printed circuit sheets 71, 81, 91; and the third printed circuit sheet 91 has two printed circuit traces 92, 93 respectively surrounding the third fitting hole 911 and the third opposing fitting hole 912. The printed circuit traces 92, 93 are electrically connected to each other. The first, second and third fitting holes 711, 811, 911 are stacked, and the first, second and third opposing fitting holes 712, 812, 912 are stacked, such that the first, second and third printed circuit sheets 71, 81, 91 are mounted on the magnetic (toroid) core of the electrodeless discharge lamp with the first, second and third fitting holes 711, 811, 911 and the first, second and third opposing fitting holes 712, 812 912 fitted around two opposite positions on the magnetic (toroid) core. The first printed circuit sheet 71 is provided with a first electrode 73. A second electrode 83 can be further provided on the second printed circuit sheet 81, and, in this case, the printed circuit trace 93 is electrically connected between the printed circuit trace 92 and the second electrode 83.

In the second embodiment of the second type of the present invention as illustrated in FIGS. 7 and 8, four pieces of the third printed circuit sheets 91 are provided. The number of the third printed circuit sheets 91 can be determined according to actual need. The larger the number of the third printed circuit sheets 91 is, the higher the obtained striking voltage is, and the easier the electrodeless discharge lamp can be started. The printed circuit traces 92, 93 are electrically connected to one another, and respectively have a tail end formed into an electrode point 921, 931. The first electrode 73 and the second electrode 83 each also have an electrode point 731, 831 extended therefrom. The first electrode 73, the second electrode 83, and the printed circuit traces 92, 93 are electrically connected to one another via the electrode points 731, 831, 921 and 931. By providing the first fitting hole 711 and first opposing fitting hole 712 on the first printed circuit sheet 71, the second fitting hole 811 and second opposing fitting hole 812 on the second printed circuit sheet 81, and the third fitting hole 911 and third opposing fitting hole 912 on each of the third printed circuit sheets 91, the number of turns of the printed circuit traces 92, 93 around the magnetic (toroid) core of the electrodeless discharge lamp can be increased to thereby obtain increased striking voltage, allowing the electrodeless discharge lamp to be more easily started.

Figure 9:
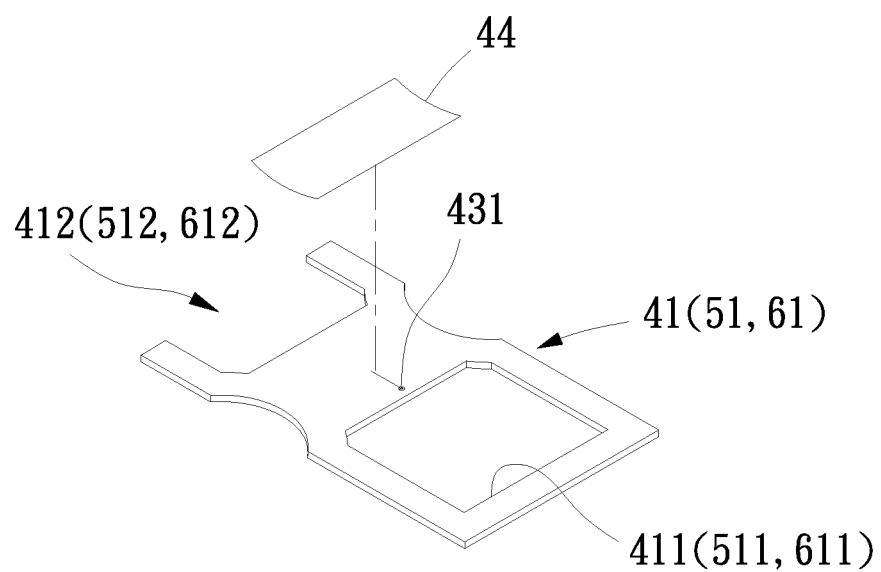
FIG. 9 is a schematic view of a starter for electrodeless discharge lamp according to a third embodiment of the second type of the present invention.

FIG. 9 is a schematic view of a starter for electrodeless discharge lamp according to a third embodiment of the second type of the present invention. The starter in the third embodiment of the second type is generally structurally similar to the first embodiment of the second type, except that the first electrode on the first printed circuit sheet 41, or the second electrode on the second printed circuit sheet 51, or both of the first and second electrodes on the first and second printed circuit sheets 41, 51 are an arcuate cross-sectioned conducting sheet 44 each. The arcuate cross-sectioned conducting sheets 44 can be fitly attached to a curved lamp tube of the electrodeless gas-discharged lamp to provide an increased contact area between them and accordingly, an enhanced starting efficiency of the lamp. The starter according to the second embodiment of the second type of the present invention can also be provided on the first and second printed circuit sheets with an arcuate cross-sectioned conducting sheet each to serve as the first and second electrodes, respectively.

Figure 10:
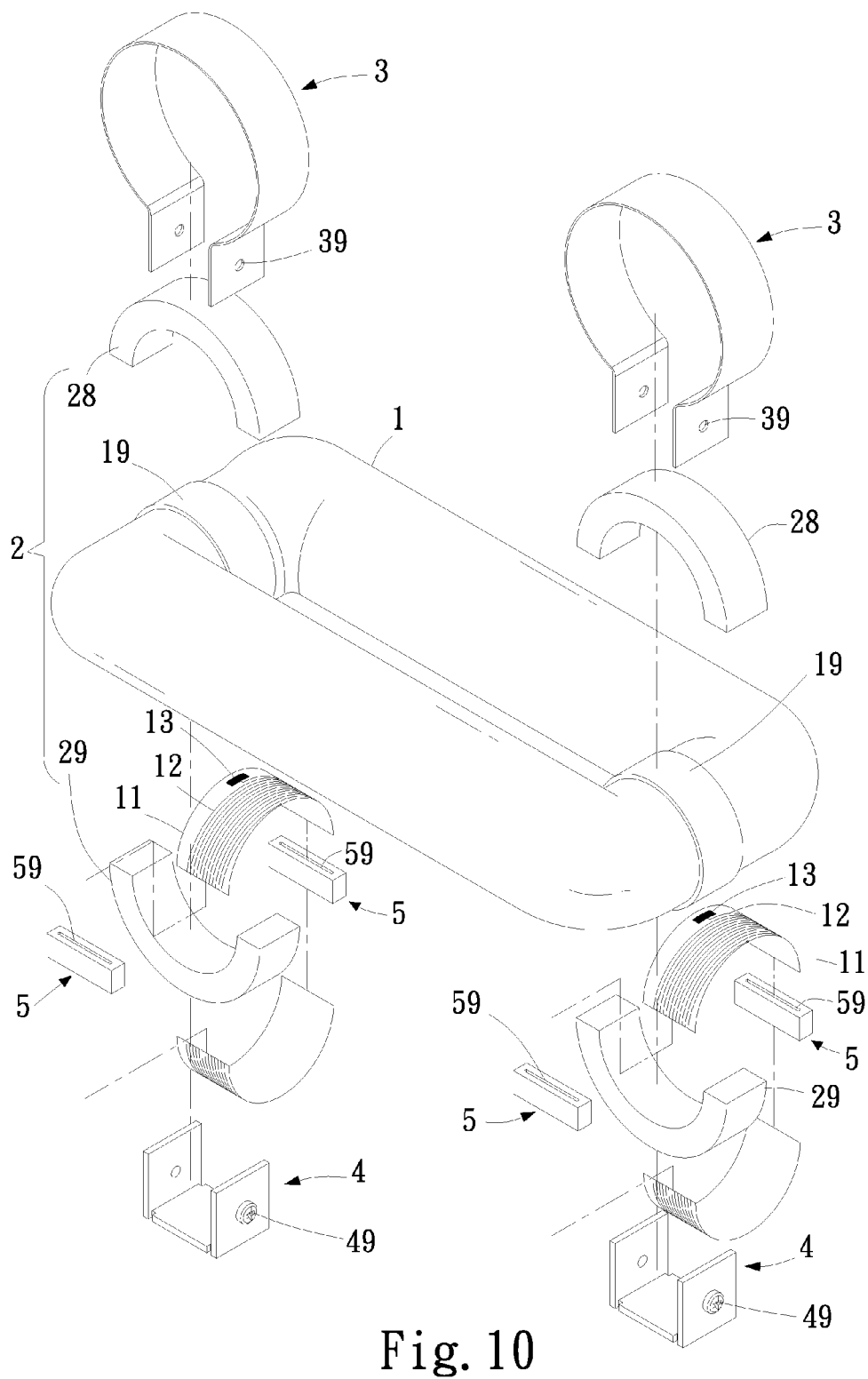
FIG. 10 is an exploded perspective view showing a first manner of mounting the starter according to the first embodiment of the first type of the present invention to an electrodeless discharge lamp.

FIG. 10 is an exploded perspective view showing a first manner of mounting the starter according to the first embodiment of the first type of the present invention to an electrodeless discharge lamp 1. As shown, the printed circuit sheet 11 is made of a flexible material. The electrodeless discharge lamp 1 is provided at two opposite positions with a buffer layer 19 each. An upper half magnetic core 28 and a lower half magnetic core 29 are fitted around each of the buffer layers 19 to form a complete magnetic (toroid) core 2. The buffer layers 19 prevent the magnetic (toroid) cores 2 from colliding with a wall surface of the electrodeless discharge lamp 1. As shown, two printed circuit sheets 11 are bent and then externally arranged around the magnetic (toroid) core 2 with two opposite lateral edges of the two printed circuit sheets 11 separately inserted in four receiving slots 59 provided on two connecting elements 5, such that the printed circuit traces 12 on the two printed circuit sheets 11 are located around the magnetic (toroid) core 2 of the electrodeless gas-charge lamp 1 and the electrodes 13 on the printed circuit sheets 11 are located close to the discharge gas inside the electrodeless discharge lamp 1. Then, a C-shaped fixing bracket 3 is fitted on an outer circumferential surface of the magnetic (toroid) core 2, and a screw 49 is extended through fastening holes 39 on free ends of the C-shaped fixing bracket 3 to lock the latter to a holding bracket 4. In FIG. 10, while two printed circuit sheets 11 are arranged around the magnetic (toroid) core 2 via two connecting elements 5, it is understood the number of the printed circuit sheets 11 for arranging around the magnetic (toroid) core 2 is not limited to two, but can be one, three, or other suitable number, and the number of the connecting elements 5 can also be adjusted to correspond to the number of the printed circuit sheets 11.

Figure 11:
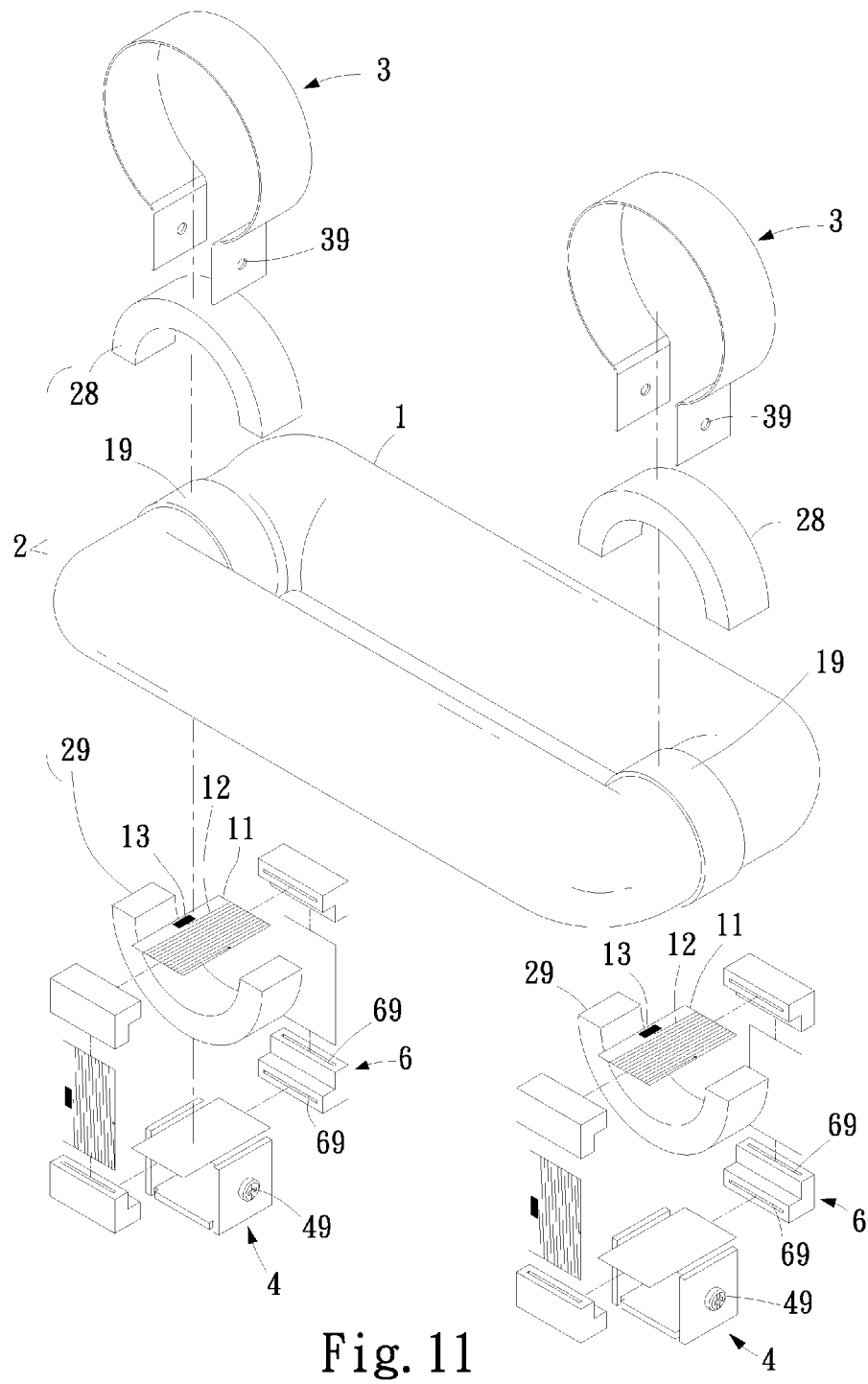
FIG. 11 is an exploded perspective view showing a second manner of mounting the starter according to the first embodiment of the first type of the present invention to an electrodeless discharge lamp.

FIG. 11 is an exploded perspective view showing a second manner of mounting the starter according to the first embodiment of the first type of the present invention to the electrodeless discharge lamp 1. As shown, the printed circuit sheets 11 used are different from those shown in FIG. 10 and are made of a rigid material. Total four printed circuit sheets 11 are arranged around the magnetic (toroid) core 2, and two opposite lateral edges of these printed circuit sheets 11 are separately inserted in eight receiving slots 69 provided on four right-angled connecting elements 6. Similarly, the number of the printed circuit sheets 11 being arranged around the magnetic (toroid) core 2 and the number of the right-angled connecting elements 6 used to connecting the printed circuit sheets 11 are not limited to four, but can be, for example, three, five or other suitable number.

Figure 12:
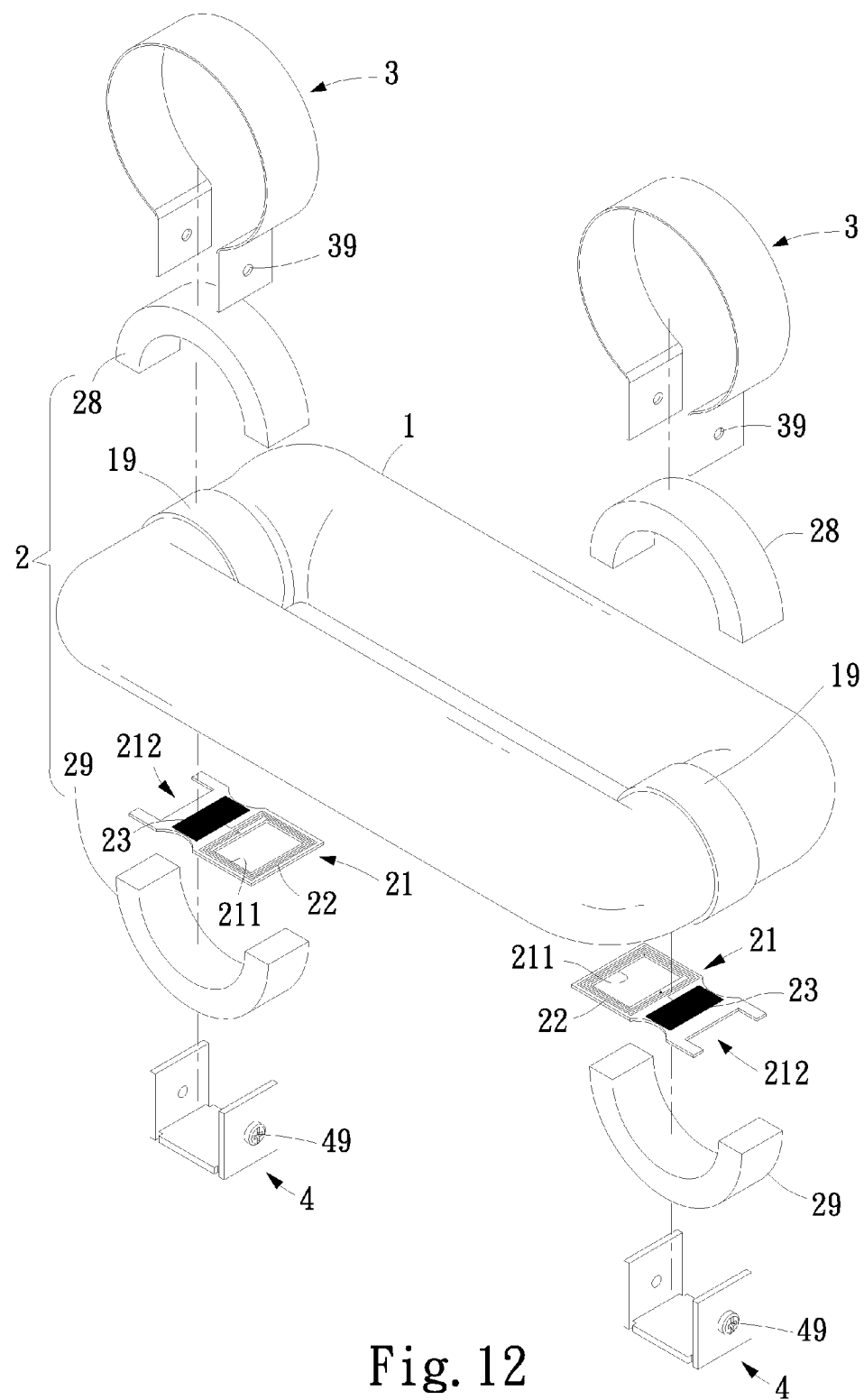
FIG. 12 is an exploded perspective view showing a manner of mounting the starter according to the second embodiment of the first type of the present invention to an electrodeless discharge lamp.

FIG. 12 is an exploded perspective view showing a manner of mounting the starter according to the second embodiment of the first type of the present invention to the electrodeless discharge lamp 1. To mount the starter, first fit the fitting hole 211 on one end portion of the printed circuit sheet 21 around a position on the lower half magnetic core 29, such that the other end portion of the printed circuit sheet 21 is located in the lower half magnetic core 29 with the engaging section 212 engaged with an opposing position on the lower half magnetic core 29. Thus, the printed circuit sheet 21 is firmly fixed to the magnetic (toroid) core 2. Again, the C-shaped fixing bracket 3 is fitted on the outer circumferential surface of the magnetic (toroid) core 2 and then locked to the holding bracket 4. However, one of the free ends of the C-shaped fixing bracket 3 is extended through the fitting hole 211 before the C-shaped fixing bracket 3 is locked to the holding bracket 4.

Figure 13:
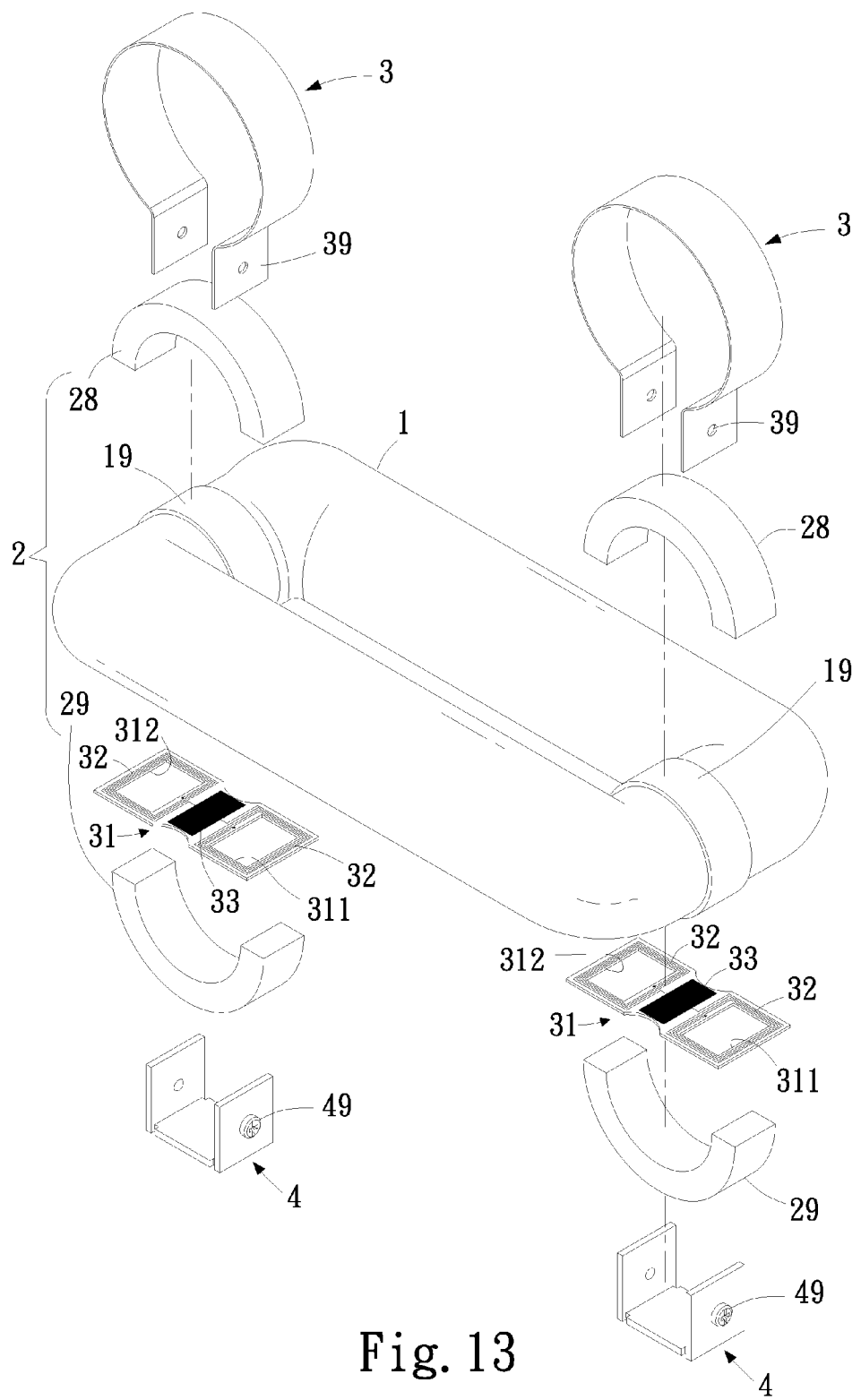
FIG. 13 is an exploded perspective view showing a manner of mounting the starter according to the third embodiment of the first type of the present invention to an electrodeless discharge lamp.

FIG. 13 is an exploded perspective view showing a manner of mounting the starter according to the third embodiment of the first type of the present invention to the electrodeless discharge lamp 1. To mount the starter, first fit the fitting holes 311, 312 on two end portions of the printed circuit sheet 31 around two opposite positions on the lower half magnetic core 29, such that the printed circuit sheet 31 is located in the lower half magnetic core 29 and firmly fixed to the magnetic (toroid) core 2. Again, the C-shaped fixing bracket 3 is fitted on the outer circumferential surface of the magnetic (toroid) core 2 and then locked to the holding bracket 4. However, the two free ends of the C-shaped fixing bracket 3 are first extended through the fitting holes 311, 312 before the C-shaped fixing bracket 3 is locked to the holding bracket 4.

Figure 14:
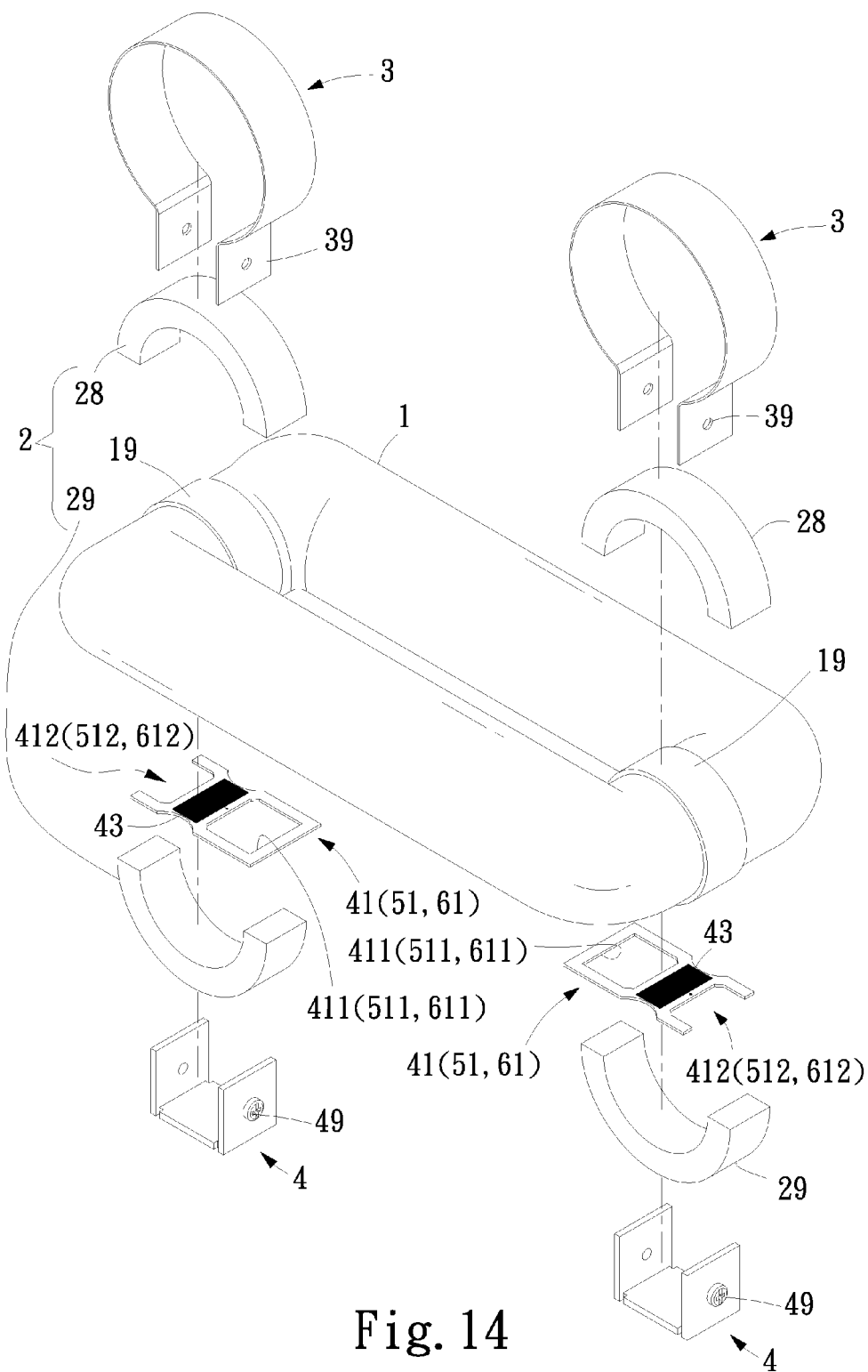
FIG. 14 is an exploded perspective view showing a manner of mounting the starter according to the first embodiment of the second type of the present invention to an electrodeless discharge lamp.

FIG. 14 is an exploded perspective view showing a manner of mounting the starter according to the first embodiment of the second type of the present invention to the electrodeless discharge lamp 1. Please refer to FIGS. 6 and 14 at the same time. The electrodeless discharge lamp 1 is provided at two opposite positions with a buffer layer 19 each. An upper half magnetic core 28 and a lower half magnetic core 29 are fitted around each of the buffer layers 19 to form a complete magnetic (toroid) core 2. The buffer layers 19 prevent the magnetic (toroid) cores 2 from colliding with a wall surface of the electrodeless discharge lamp 1. One starter is mounted to each of the magnetic (toroid) cores 2. To mount the starter, first fit the fitting holes 411, 511, 611 respectively formed on one end portion of the printed circuit sheets 41, 51, 61 around a position on the lower half magnetic core 29, such that the other end portion of the printed circuit sheets 41, 51, 61 are located in the lower half magnetic core 29 with the engaging sections 412, 512, 612 engaged with an opposing position on the lower half magnetic core 29. Thus, the printed circuit sheets 41, 51, 61 are firmly fixed to the magnetic (toroid) core 2. A C-shaped fixing bracket 3 is fitted on the outer circumferential surface of the magnetic (toroid) core 2 with one of two free ends thereof extended through the fitting holes 411, 511, 611. At this point, the printed circuit traces 62 surround the magnetic (toroid) core 2 and the first electrode 43 is located close to a discharge gas inside the electrodeless discharge lamp 1. Then, a screw 49 is extended through fastening holes 39 on free ends of the C-shaped fixing bracket 3 to lock the latter to a holding bracket 4.

Figure 15:
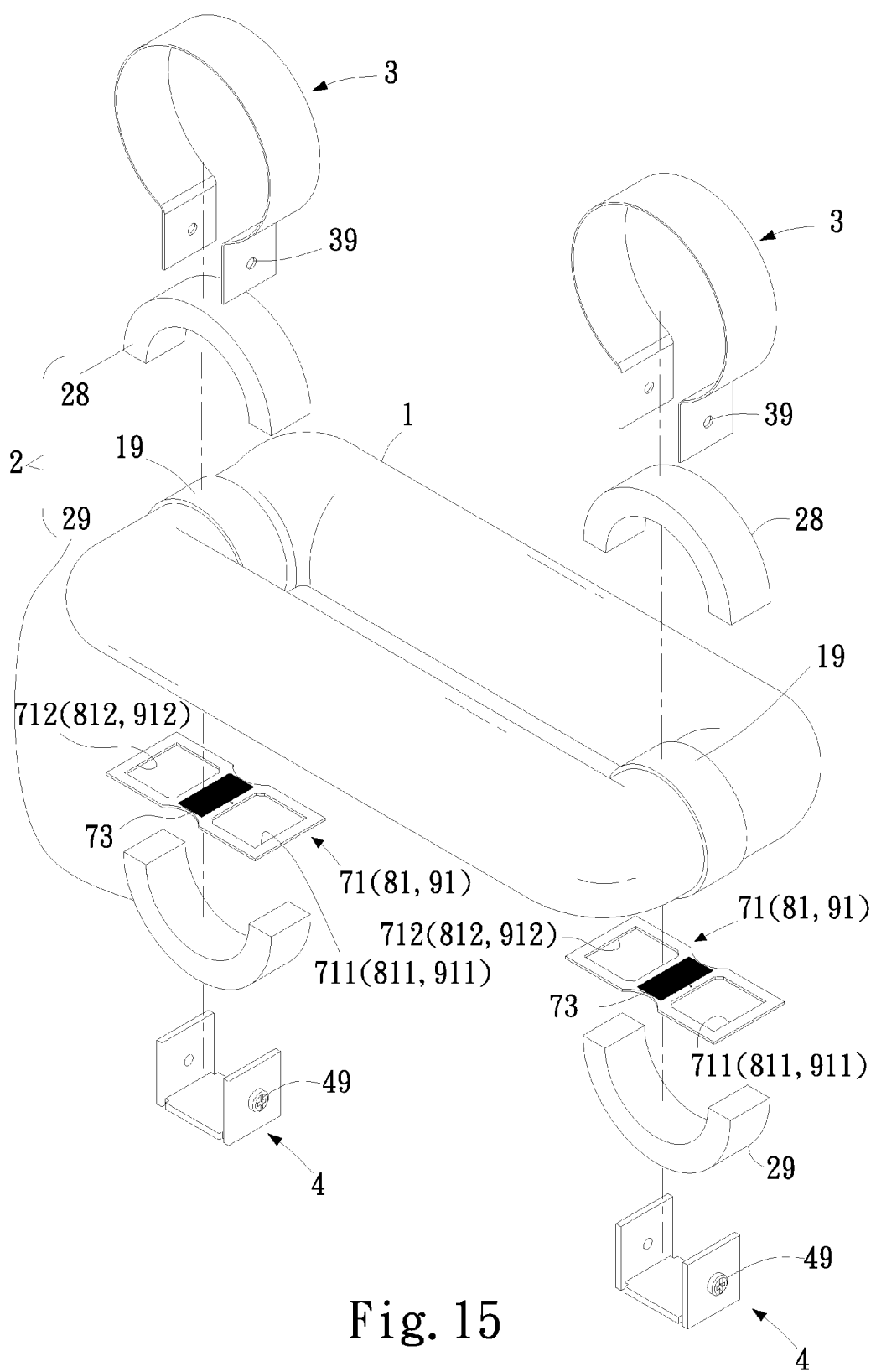
FIG. 15 is an exploded perspective view showing a manner of mounting the starter according to the second embodiment of the second type of the present invention to an electrodeless discharge lamp.

FIG. 15 is an exploded perspective view showing a manner of mounting the starter according to the second embodiment of the second type of the present invention to the electrodeless discharge lamp 1. Please refer to FIGS. 8 and 15 at the same time. To mount the starter, first fit the fitting holes 711, 811, 911 and the opposing fitting holes 712, 812, 912 on two end portions of the printed circuit sheets 71, 81, 91 around two opposite positions on the lower half magnetic core 29, such that the printed circuit sheets 71, 81, 91 are firmly fixed to the magnetic (toroid) core 2. The C-shaped fixing bracket 3 is fitted on the outer circumferential surface of the magnetic (toroid) core 2 with two free ends thereof extended through the fitting holes 711, 811, 911 and the opposing fitting holes 712, 812, 912, and is then locked to the holding bracket 4.

Figure 16:
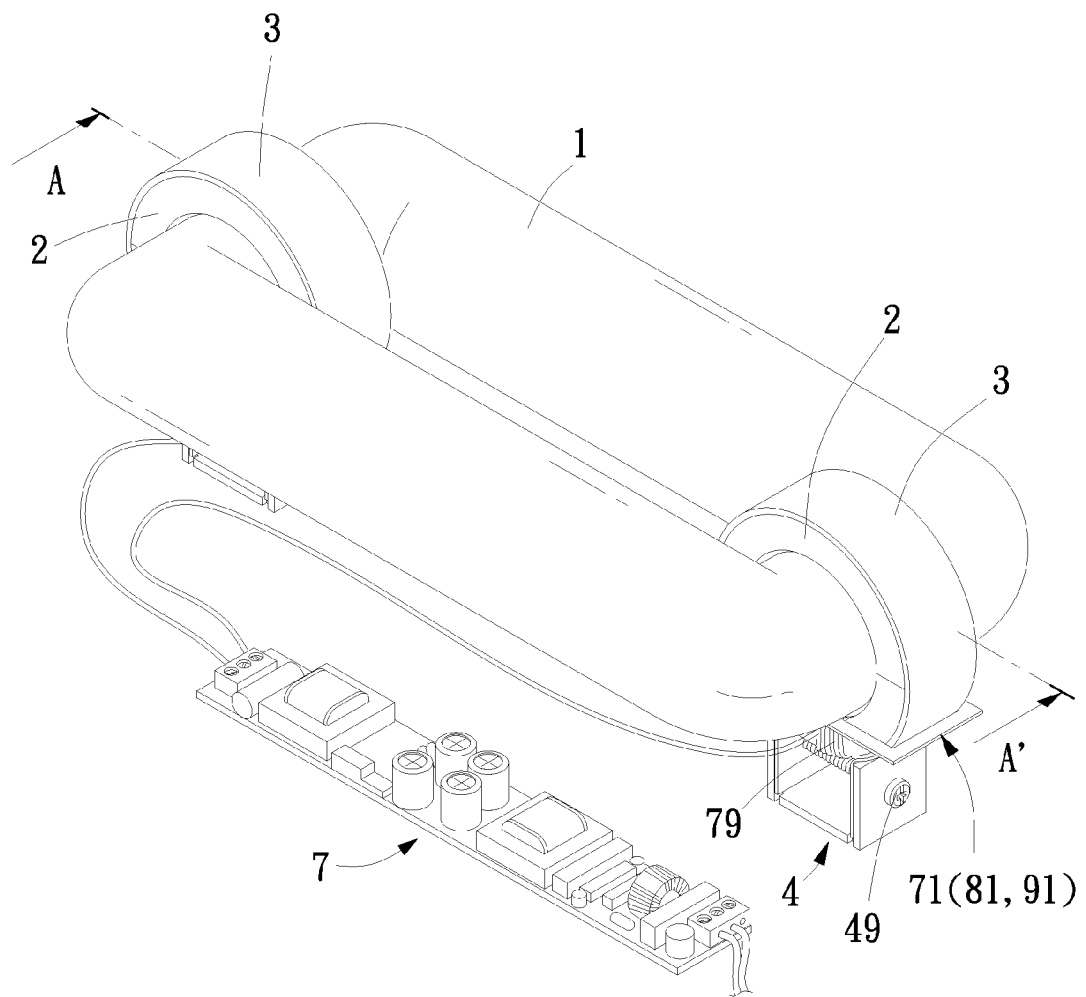
FIG. 16 is an assembled view of FIG. 15.
Figure 17:
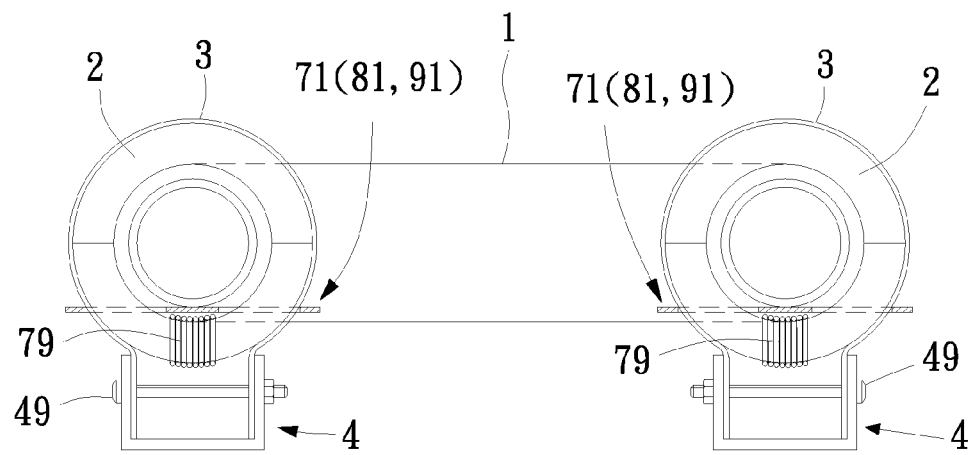
FIG. 17 is a sectional view taken along line A-A' of FIG. 16.
Figure 18:
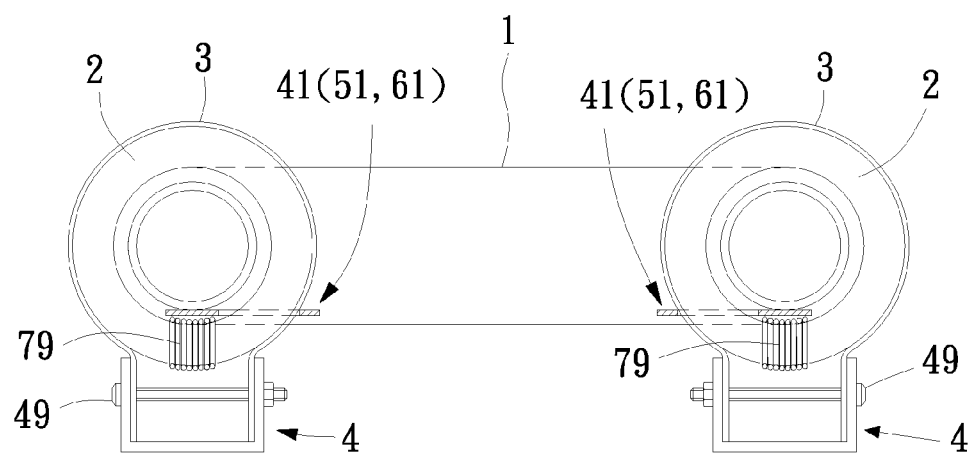
FIG. 18 is an assembled sectional view of FIG. 14.

FIG. 16 is an assembled view of FIG. 15, and FIG. 17 is a sectional view taken along line A-A' of FIG. 16. As shown, a main winding 79 is formed on the magnetic (toroid) core 2 by a ballast 7. The main winding 79 cooperates with the starter according to the second embodiment of the second type of the present invention for the electrodeless discharge lamp 1 to be started more easily. FIG. 18 is an assembled sectional view of FIG. 14. Please refer to FIGS. 16 and 18 at the same time. The main winding 79 formed on the magnetic (toroid) core 2 by the ballast 7 can also cooperate with the starter according to the first embodiment of the second type of the present invention for the electrodeless discharge lamp 1 to be started more easily.

Figure 19:
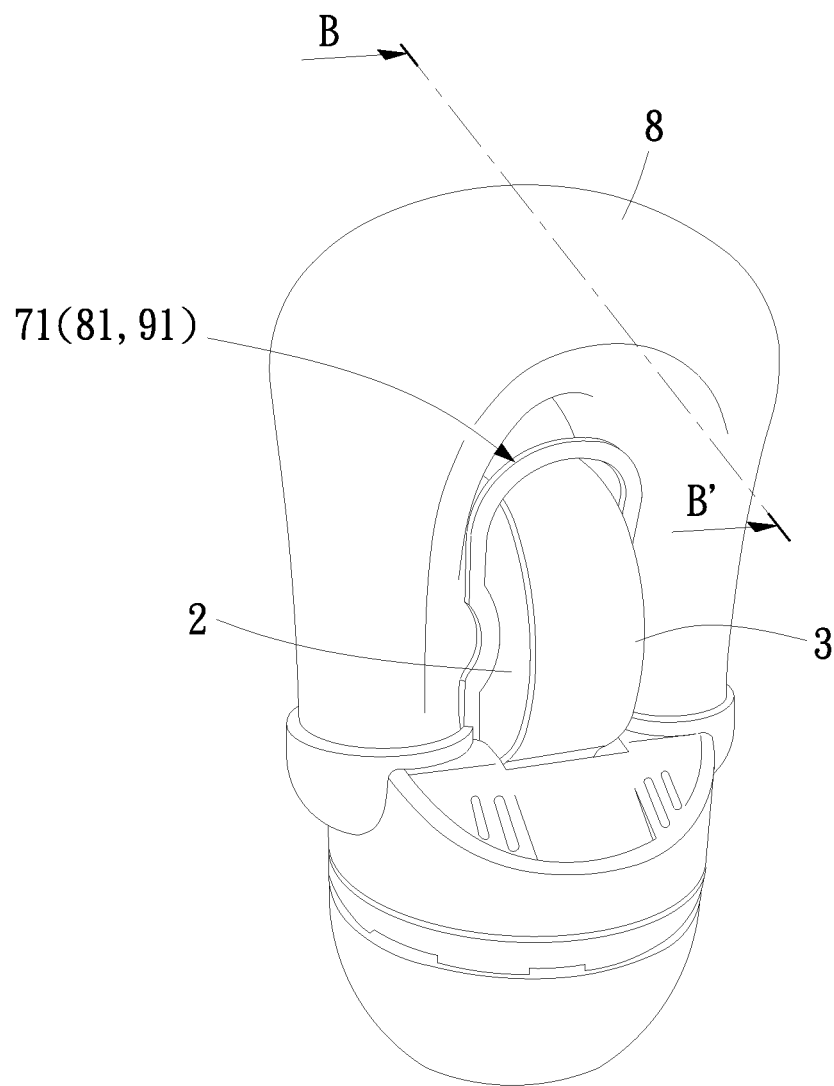
FIG. 19 is an assembled perspective view showing the mounting of the starter according to the second embodiment of the second type of the present invention to a differently shaped electrodeless discharge lamp.
Figure 20:
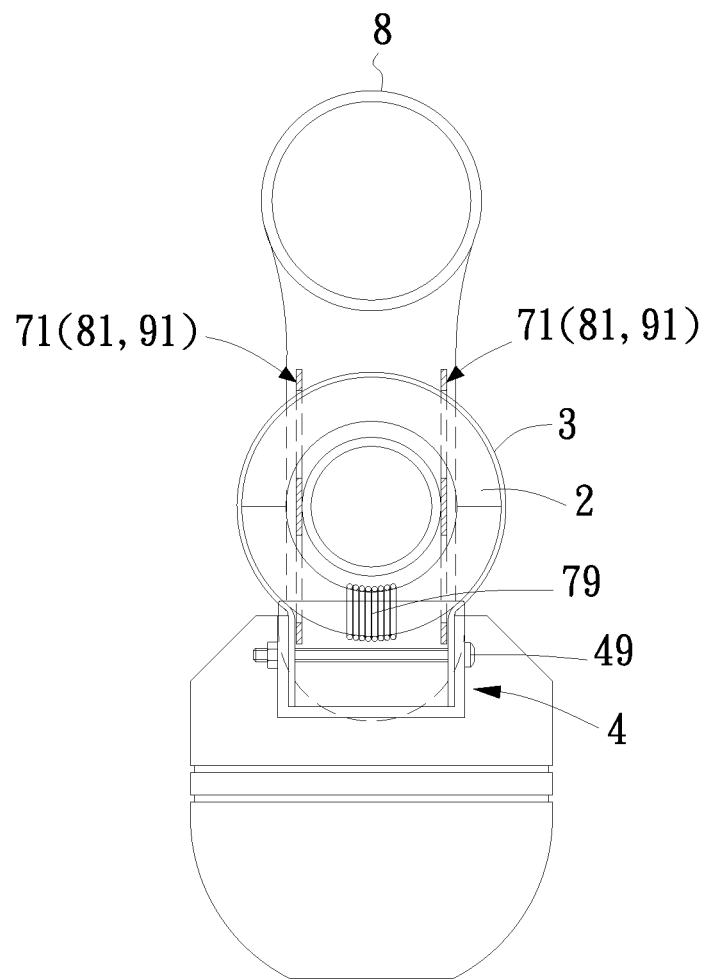
FIG. 20 is a sectional view taken along line B-B' of FIG. 19.
Figure 21:
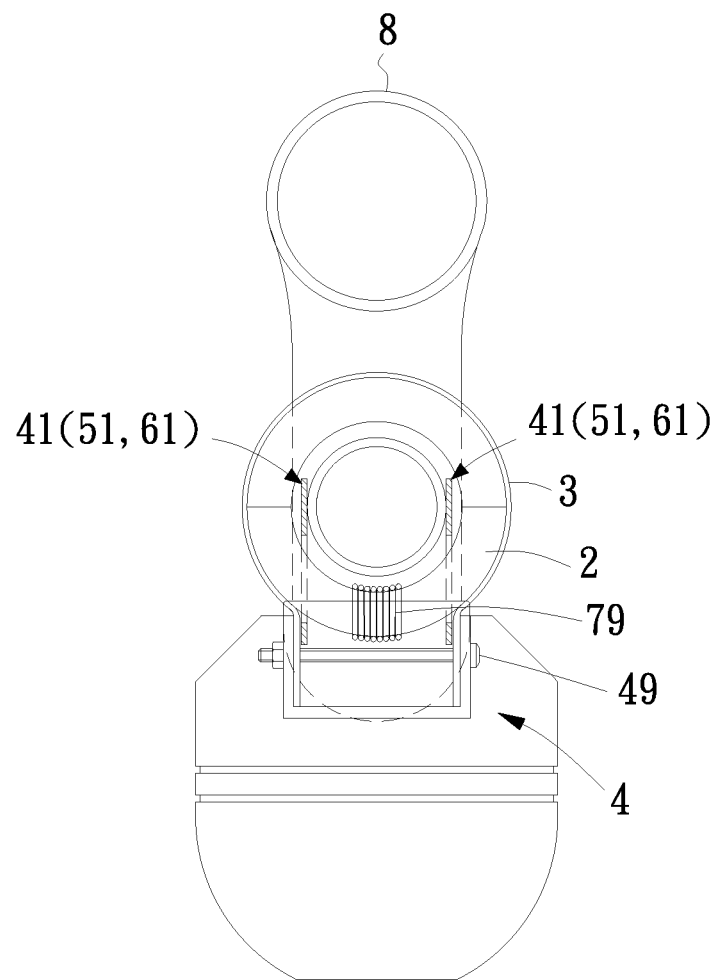
FIG. 21 is an assembled sectional view showing the mounting of the starter according to the first embodiment of the second type of the present invention to a differently shaped electrodeless discharge lamp.

FIG. 19 is an assembled perspective view showing the mounting of the starter according to the second embodiment of the second type of the present invention to a differently shaped electrodeless discharge lamp 8; and FIG. 20 is a sectional view taken along line B-B' of FIG. 19. To match a configuration of an inner periphery of the electrodeless discharge lamp 8, angles on an outer periphery of the starter of the present invention are rounded. FIG. 21 is an assembled sectional view showing the mounting of the starter according to the first embodiment of the second type of the present invention to the differently shaped electrodeless discharge lamp 8. As shown, the starter according to the first embodiment of the second type of the present invention can also be used with the electrodeless discharge lamp 8.

In FIGS. 10 through 15, 20 and 21, the starters according to different embodiments of different types of the present invention are mounted to two opposite positions on the electrodeless discharge lamp, allowing the electrodeless discharge lamp to be started more easily, particularly when the lamp is used in cold weather. However, the starters according to different embodiments of different types of the present invention can also be mounted to only one position on the electrodeless discharge lamp.

Figure 22:
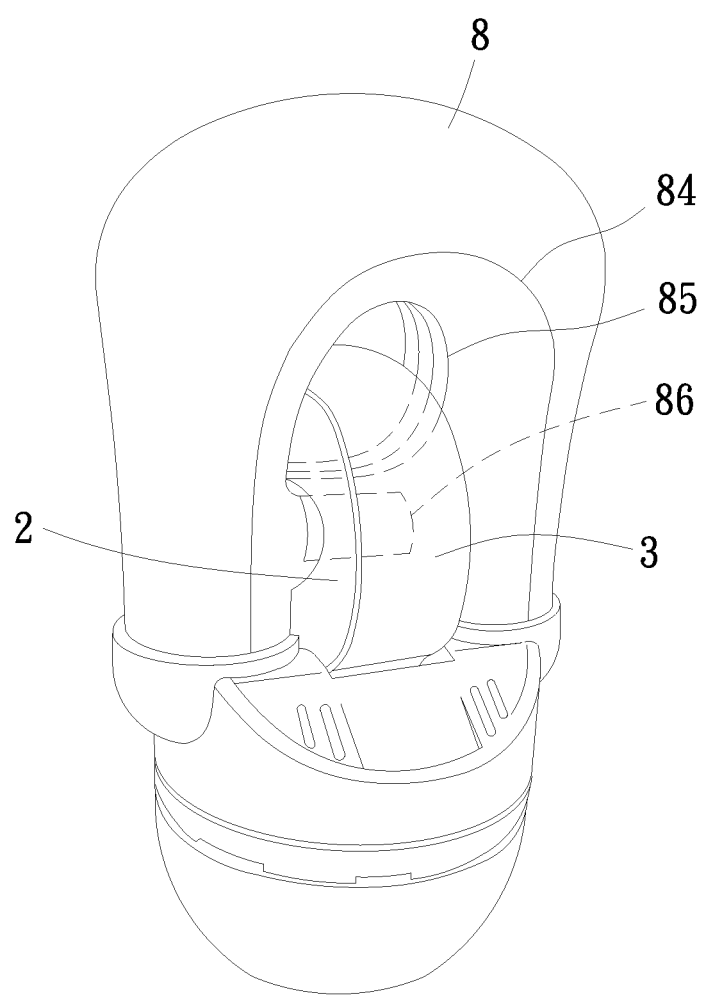
FIG. 22 is a perspective view showing a starter according to a fifth embodiment of the first type of the present invention being applied to an electrodeless discharge lamp.

FIG. 22 is a perspective view showing a starter according to a fifth embodiment of the first type of the present invention being applied to an electrodeless discharge lamp 8. As shown, the starter in this fifth embodiment of the first type of the present invention includes a printed circuit sheet 84, printed circuit traces 85, and an electrode 86 that are directly coated on the electrodeless discharge lamp 8. And, the printed circuit traces 85 and the electrode 86 can be formed using tin dioxide ($SnO_2$) to avoid blocking light emitted by the electrodeless discharge lamp 8.

Figure 23:
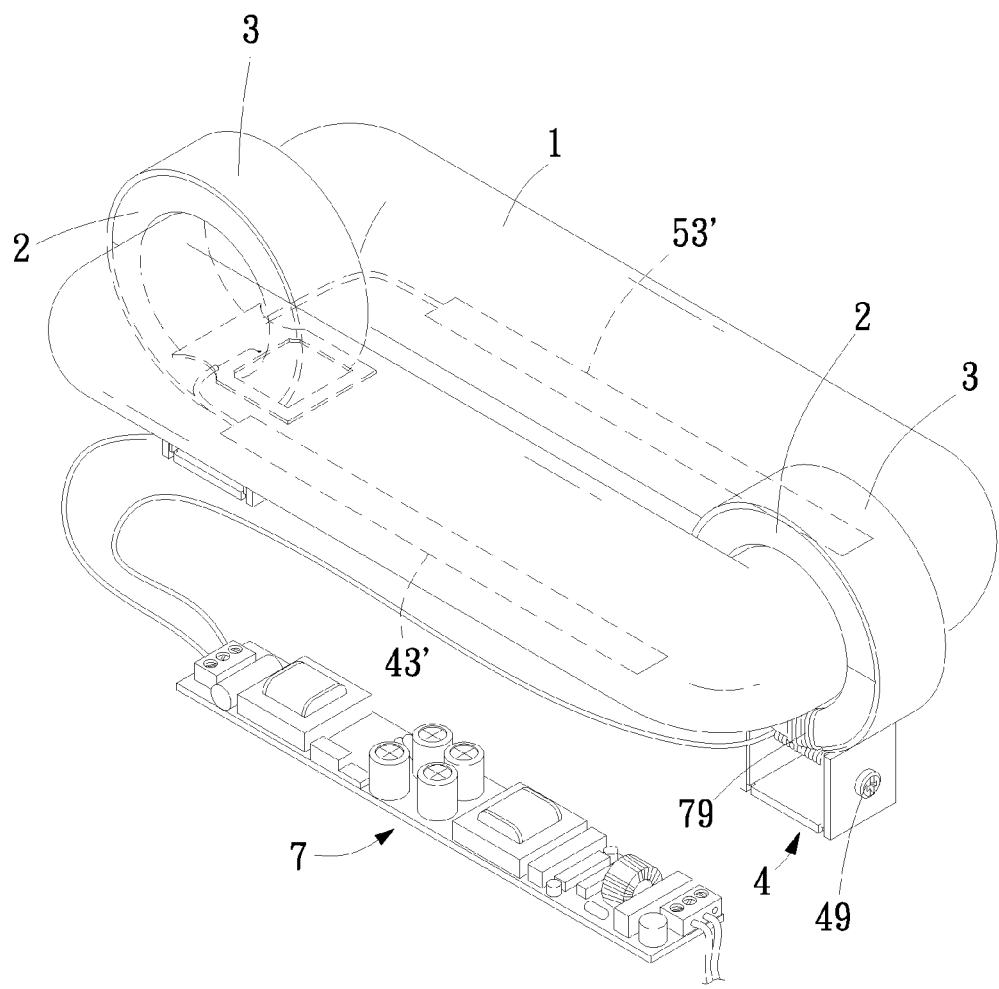
FIG. 23 is an assembled perspective view showing a first manner of mounting the starter according to the first embodiment of the second type of the present invention to an electrodeless discharge lamp.

FIG. 23 is an assembled perspective view showing a first manner of mounting the starter according to the first embodiment of the second type of the present invention to an electrodeless discharge lamp. Please also refer to FIG. 6 at the same time. In the first embodiment of the second type of the present invention, a first electrode 43' and a second electrode 53' can also be extended from the electrode points 431, 531, then the first electrode 43' and the second electrode 53' are attached to the electrodeless discharge lamp 1. The same manner can be also applied to all embodiments of the first type of the present invention and other embodiments of the second type of the present invention.

Figure 24:
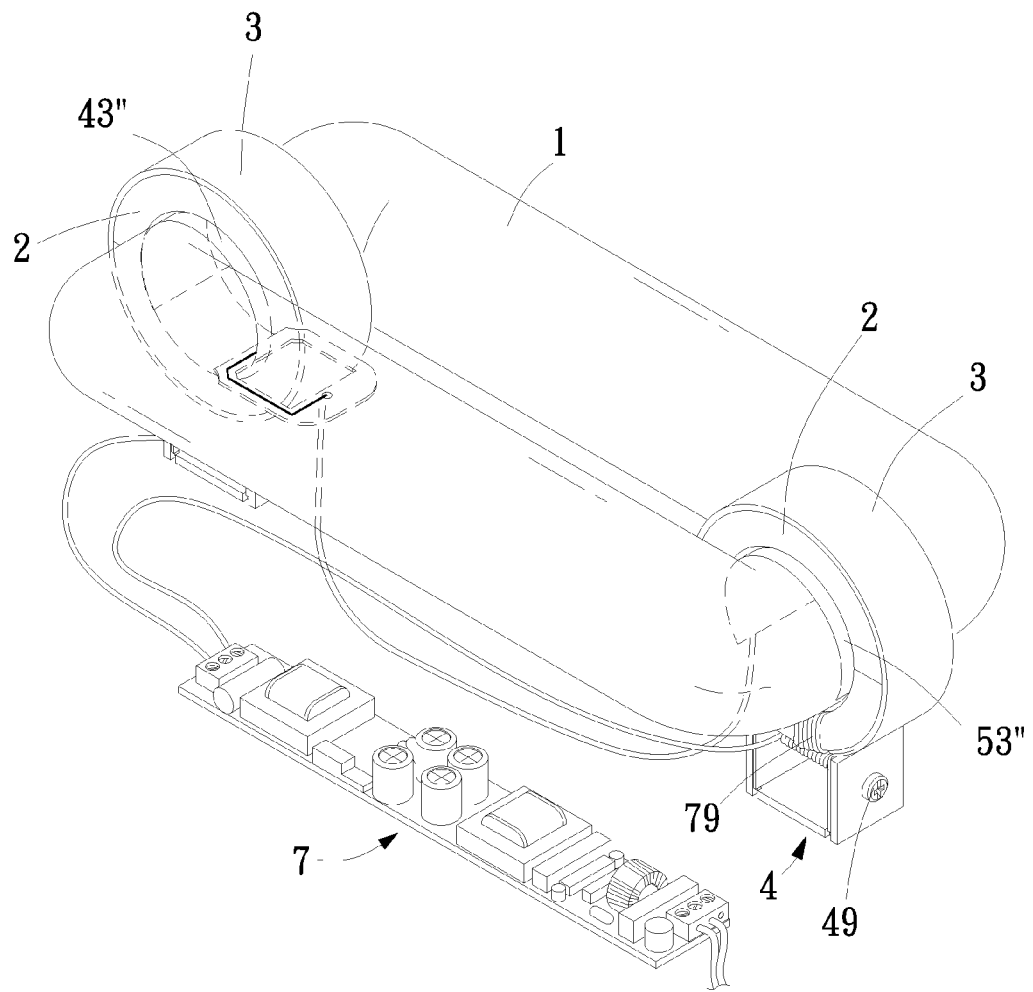
FIG. 24 is an assembled perspective view showing a second manner of mounting the starter according to the first embodiment of the second type of the present invention to an electrodeless discharge lamp.

FIG. 24 is an assembled perspective view showing a second manner of mounting the starter according to the first embodiment of the second type of the present invention to an electrodeless discharge lamp. Please also refer to FIG. 6 at the same time. In order to prevent the opaque electrode 43', 53' of FIG. 23 cover light. In the first embodiment of the second type of the present invention, a first electrode 43" and a second electrode 53" can also be extended from the electrode points 431, 531 to a place between the magnetic (toroid) core 2 and the electrodeless discharge lamp 1. The electrode points 431, 531 can be located between the magnetic (toroid) core 2 and the electrodeless discharge lamp 1, or outside the magnetic (toroid) core 2. The same manner can be also applied to all embodiments of the first type of the present invention and other embodiments of the second type of the present invention.

What is claimed is:

1. A starter for electrodeless discharge lamp, comprising:
   a printed circuit sheet;
   at least one printed circuit trace being provided on a surface of the printed circuit sheet; and
   at least one electrode being provided on the surface of the printed circuit sheet to electrically connected to the printed circuit trace;
   wherein the printed circuit sheet is arranged on a magnetic core of an electrodeless discharge lamp, such that the printed circuit trace is located around the magnetic core and the electrode is located close to a discharge gas inside the electrodeless discharge lamp, wherein said printed circuit traces are provided on the printed circuit sheet to parallel space from one another and obliquely extend across and between two opposite lateral edges of the printed circuit sheet, such that two ends of each of the printed circuit traces are separately located at the two opposite lateral edges of the printed circuit sheet.

2. The starter for electrodeless discharge lamp as claimed in claim 1, wherein the printed circuit sheet is also provided on an opposing surface with at least one printed circuit trace and at least one electrode electrically connected to the printed circuit trace.

3. A starter for electrodeless discharge lamp, comprising:
a first printed circuit sheet being provided with a first fitting hole and a first electrode; a second printed circuit sheet being provided with a second fitting hole; and
at least one third printed circuit sheet being located between the first and the second printed circuit sheet and provided with a third fitting hole and a printed circuit trace surrounds the third fitting hole; and
the printed circuit trace being electrically connected to the first electrode; and
the first, the second, and the third fitting hole being stacked for fitting around a position on a magnetic core of an electrodeless discharge lamp, and the first electrode is located close to a discharge gas inside the electrodeless discharge lamp.

4. The starter for electrodeless discharge lamp as claimed in claim 3, wherein the second printed circuit sheet is provided with a second electrode.

5. The starter for electrodeless discharge lamp as claimed in claim 3, wherein the first printed circuit sheet is provided with a first engaging section, the second printed circuit sheet is provided with a second engaging section, and the third printed circuit sheet is provided with a third engaging section; and the first, the second, and the third engaging section being stacked for engaging with an position on the magnetic core of the electrodeless discharge lamp.

6. The starter for electrodeless discharge lamp as claimed in claim 4, wherein the first printed circuit sheet is provided with a first engaging section, the second printed circuit sheet is provided with a second engaging section, and the third printed circuit sheet is provided with a third engaging section; and the first, the second, and the third engaging section being stacked for engaging with an position on the magnetic core of the electrodeless discharge lamp.

7. The starter for electrodeless discharge lamp as claimed in claim 3, wherein the first printed circuit sheet is provided with a first opposing fitting hole, the second printed circuit sheet is provided with a second opposing fitting hole, and the third printed circuit sheet is provided with a third opposing fitting hole; the third printed circuit sheet being provided with another printed circuit trace surrounds the third opposing fitting hole and electrically connected to the printed circuit trace, the first, the second, and the third opposing fitting hole being stacked for fitting around an position on the magnetic core of the electrodeless discharge lamp.

8. The starter for electrodeless discharge lamp as claimed in claim 4, wherein the first printed circuit sheet is provided with a first opposing fitting hole, the second printed circuit sheet is provided with a second opposing fitting hole, and the third printed circuit sheet is provided with a third opposing fitting hole; the third printed circuit sheet being provided with another printed circuit trace surrounds the third opposing fitting hole and electrically connected between the printed circuit trace and the second electrode; and the first, the second, and the third opposing fitting hole being stacked for fitting around an position of the magnetic core of the electrodeless discharge lamp.

9. The starter for electrodeless discharge lamp as claimed in claim 3, wherein the first electrode is an arcuate cross-sectioned conducting sheet.

10. The starter for electrodeless discharge lamp as claimed in claim 4, wherein the second electrode is an arcuate cross-sectioned conducting sheet.

* * * * *